(12) United States Patent
Xu et al.

(10) Patent No.: US 10,681,671 B2
(45) Date of Patent: Jun. 9, 2020

(54) PAGING METHOD, DEVICE, AND SYSTEM

(71) Applicant: HUAWEI TECHNOLOGIES CO., LTD., Shenzhen, Guangdong (CN)

(72) Inventors: Xiaoying Xu, Shanghai (CN); Tianle Deng, Shanghai (CN); Hongzhuo Zhang, Shanghai (CN); Xiaoxiao Zheng, Shanghai (CN); Li Yang, Shanghai (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/964,922

(22) Filed: Apr. 27, 2018

(65) Prior Publication Data
US 2018/0249439 A1 Aug. 30, 2018

Related U.S. Application Data

(63) Continuation of application No. PCT/CN2015/093257, filed on Oct. 29, 2015.

(51) Int. Cl.
*H04W 68/00* (2009.01)
*H04W 68/02* (2009.01)

(52) U.S. Cl.
CPC ......... *H04W 68/005* (2013.01); *H04W 68/02* (2013.01)

(58) Field of Classification Search
CPC . H04W 68/002; H04W 68/02; H04W 74/006; H04W 74/008; H04W 72/1289; H04W 68/005

(Continued)

(56) References Cited

U.S. PATENT DOCUMENTS 5,983,099 A * 11/1999 Yao ................. H04W 84/08
455/426.1
2003/0202487 A1 10/2003 Harris et al.
(Continued)

FOREIGN PATENT DOCUMENTS

CN 1650644 A 8/2005
CN 1965597 A 5/2007
(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 12)," 3GPP TS 36.331, V12.7.0, Sep. 2015, 453 pgs.
(Continued)

*Primary Examiner* — Anthony S Addy
*Assistant Examiner* — Farid Seyedvosoghi
(74) *Attorney, Agent, or Firm* — Womble Bond Dickinson (US) LLP

(57) ABSTRACT

Embodiments of the present disclosure provide a paging method, a device, and a system, and relate to the communications field, so as to reduce signaling exchange performed when an access network device pages UE, save a network resource, and improve data transmission efficiency. The paging method includes: receiving, by user equipment (UE), paging information sent by an access network device, where the paging information is used to instruct the UE to send a paging response by using an uplink data sending resource; and obtaining, by the UE, the uplink data sending resource according to the paging information, and sending paging response information to the access network device by using the uplink data sending resource.

19 Claims, 6 Drawing Sheets

(58) Field of Classification Search
USPC ........................................................ 455/458
See application file for complete search history.

(56) References Cited

U.S. PATENT DOCUMENTS

| | | | | |
|---|---|---|---|---|
| 2007/0218889 | A1* | 9/2007 | Zhang | H04W 68/00 455/422.1 |
| 2010/0014468 | A1 | 1/2010 | Lee et al. | |
| 2010/0296421 | A1 | 11/2010 | Watfa et al. | |
| 2011/0092229 | A1 | 4/2011 | Chang et al. | |
| 2011/0261763 | A1* | 10/2011 | Chun | H04W 74/008 370/329 |
| 2011/0274040 | A1* | 11/2011 | Pani | H04W 4/70 370/328 |
| 2014/0016562 | A1 | 1/2014 | Watfa et al. | |
| 2014/0148199 | A1* | 5/2014 | Park | H04W 60/00 455/456.2 |
| 2014/0198761 | A1* | 7/2014 | Hooli | H04W 72/08 370/329 |
| 2016/0081115 | A1 | 3/2016 | Pang et al. | |

FOREIGN PATENT DOCUMENTS

| | | |
|---|---|---|
| CN | 101048000 A | 10/2007 |
| CN | 101282515 A | 10/2008 |
| CN | 101340709 A | 1/2009 |
| CN | 102388661 A | 3/2012 |
| CN | 102740262 A | 10/2012 |
| CN | 102802127 A | 11/2012 |
| CN | 102891741 A | 1/2013 |
| CN | 103096438 A | 5/2013 |
| CN | 104380765 A | 2/2015 |
| EP | 1420551 A2 | 5/2004 |
| EP | 2651048 A2 | 10/2013 |
| WO | 2015094057 A1 | 6/2015 |
| WO | 2017050498 A1 | 3/2017 |

OTHER PUBLICATIONS

"3$^{rd}$ Generation Partnership Project; Technical Specification Group Services and System Aspects; Study on Machine-Type Communications (MTC) and other mobile data applications communications enhancements (Release 12)," 3GPP TR 23.887, V12.0.0, Dec. 2013, 151 pgs.

International Search Report dated Jul. 19, 2016, in corresponding International Patent Application No. PCT/CN2015/093257, 7 pgs.

Written Opinion of the International Search Authority dated Jul. 19, 2016, in corresponding International Patent Application No. PCT/CN2015/093257, 4 pgs.

International Search Report dated Jul. 19, 2016 in corresponding International Patent Application No. PCT/CN2015/093257.

European Search Report dated Sep. 20, 2018 in corresponding European Patent Application No. 2 651 048 A2 (7 pages).

Chinese Office Action dated Apr. 16, 2019 in related Chinese Application No. 201580044419.X (8 pages).

* cited by examiner

PAGING METHOD, DEVICE, AND SYSTEM

CROSS-REFERENCE TO RELATED APPLICATIONS

This application is a continuation of International Application No. PCT/CN2015/093257, filed on Oct. 29, 2015, the disclosure of which is hereby incorporated by reference in its entirety.

TECHNICAL FIELD

The present disclosure relates to the communications field, and in particular, to a paging method, a device, and a system.

BACKGROUND

As a machine to machine (M2M) technology is widely popularized, increasingly more data is transmitted between user equipment (UE) and an access network device. If the access network device needs to send data to UE that is in an idle state, a non-synchronous state, or a loose synchronous state, the access network device first needs to page the UE.

In the prior art, a process of paging the UE by the access network device includes: The UE usually establishes a radio link to the access network device in a random access manner after receiving paging information sent by the access network device, and the UE can send paging response information to the access network device only after the UE establishes the radio link to the access network device in the random access manner, so that the access network device and the UE can perform a subsequent data transmission process.

However, in the foregoing paging process, the UE establishes the radio link to the access network device by means of random access. Consequently, there are a plurality of times of signaling exchange between the UE and the access network device, a relatively large quantity of network resources are occupied, and data transmission efficiency is low.

SUMMARY

Embodiments of the present disclosure provide a paging method, a device, and a system, so as to reduce signaling exchange performed when an access network device pages UE, save a network resource, and improve data transmission efficiency.

To achieve the foregoing objective, the following technical solutions are used in the embodiments of the present disclosure:

According to a first aspect, an embodiment of the present disclosure provides a paging method, including:

receiving, by user equipment (UE), paging information sent by an access network device, where the paging information is used to instruct the UE to send a paging response by using an uplink data sending resource; and obtaining, by the UE, the uplink data sending resource according to the paging information, and sending paging response information to the access network device by using the uplink data sending resource.

In the paging method provided in this embodiment of the present disclosure, the paging information instructs the UE to send the paging response information by using the uplink data sending resource, and therefore, after receiving the paging information sent by the access network device, the UE can directly send the paging response information to the access network device by using the uplink data sending resource. In this way, a process of randomly accessing the access network device by the UE is saved, there is little signaling exchange when the access network device pages the UE, a network resource is saved, and data transmission efficiency is improved.

Further, the uplink data sending resource is an unscheduled uplink data sending resource or a shared uplink data sending resource. Therefore, by using the paging method provided in this embodiment of the present disclosure, the UE can directly send the paging response information to the access network device by using the unscheduled uplink data sending resource or the shared uplink data sending resource.

In a first possible implementation, the paging response information includes a higher layer identifier of the UE, and the higher layer identifier of the UE is any one or more of a system architecture evolution-temporary mobile subscriber identity (S-TMSI), a mobility management entity-temporary mobile subscriber identity (M-TMSI), an international mobile subscriber identity (IMSI), or an internet protocol (IP) address of the UE.

In a second possible implementation, the paging information includes first information, the first information includes a radio network temporary identifier (RNTI) and a higher layer identifier of the UE, and the higher layer identifier of the UE is any one or more of an S-TMSI, an M-TMSI, an IMSI, or an IP address of the UE.

Further, the RNTI is allocated by the access network device to the UE, and the RNTI and the higher layer identifier of the UE are in a mapping relationship.

Further, the paging response information includes at least one of the RNTI and the higher layer identifier of the UE.

In a third possible implementation, the paging information includes dedicated access preamble sequence information, the dedicated access preamble sequence information includes dedicated access preamble sequence code and a higher layer identifier of the UE, and the higher layer identifier of the UE is any one or more of an S-TMSI, an M-TMSI, an IMSI, or an IP address of the UE.

Further, the paging response information includes at least one of the dedicated access preamble sequence code and the higher layer identifier of the UE.

According to a second aspect, an embodiment of the present disclosure provides a paging method, including:

sending, by an access network device, paging information to user equipment (UE), where the paging information is used to instruct the UE to send a paging response by using an uplink data sending resource; and receiving, by the access network device, paging response information sent by the UE by using the uplink data sending resource.

In the paging method provided in this embodiment of the present disclosure, the paging response information received by the access network device is directly sent by the UE by using the uplink data sending resource, and therefore, a process of randomly accessing the access network device by the UE is saved, there is little signaling exchange when the access network device pages the UE, a network resource is saved, and data transmission efficiency is improved.

Further, the uplink data sending resource is an unscheduled uplink data sending resource or a shared uplink data sending resource. Therefore, by using the paging method provided in this embodiment of the present disclosure, the access network device can directly receive the paging response information sent by the UE by using the unscheduled uplink data sending resource or the shared uplink data sending resource.

In a first possible implementation, the paging response information includes a higher layer identifier of the UE, and the higher layer identifier of the UE is any one or more of a system architecture evolution-temporary mobile subscriber identity (S-TMSI), a mobility management entity-temporary mobile subscriber identity (M-TMSI), an international mobile subscriber identity (IMSI), or an internet protocol (IP) address of the UE.

In a second possible implementation, the paging information includes first information, the first information includes a radio network temporary identifier (RNTI) and a higher layer identifier of the UE, and the higher layer identifier of the UE is any one or more of an S-TMSI, an M-TMSI, an IMSI, or an IP address of the UE.

Further, the RNTI is allocated by the access network device to the UE, and the RNTI and the higher layer identifier of the UE are in a mapping relationship.

Further, the paging response information includes at least one of the RNTI and the higher layer identifier of the UE.

In a third possible implementation, the paging information includes dedicated access preamble sequence information, the dedicated access preamble sequence information includes dedicated access preamble sequence code and a higher layer identifier of the UE, and the higher layer identifier of the UE is any one or more of an S-TMSI, an M-TMSI, an IMSI, or an IP address of the UE.

Further, the paging response information includes at least one of the dedicated access preamble sequence code and the higher layer identifier of the UE.

According to a third aspect, an embodiment of the present disclosure provides user equipment, including a receiving unit, an obtaining unit, and a sending unit, where the receiving unit is configured to receive paging information sent by an access network device, where the paging information is used to instruct the UE to send a paging response by using an uplink data sending resource;

the obtaining unit is configured to obtain the uplink data sending resource according to the paging information after the receiving unit receives the paging information sent by the access network device; and the sending unit is configured to: after the obtaining unit obtains the uplink data sending resource, send paging response information to the access network device by using the uplink data sending resource.

For a technical effect of the user equipment provided in this embodiment of the present disclosure, refer to the technical effect of the user equipment described in the paging method performed by the user equipment in the first aspect. Details are not described herein again.

According to a fourth aspect, an embodiment of the present disclosure provides an access network device, including a sending unit and a receiving unit, where the sending unit is configured to send paging information to user equipment (UE), where the paging information is used to instruct the UE to send a paging response by using an uplink data sending resource; and the receiving unit is configured to: after the sending unit sends the paging information to the UE, receive paging response information sent by the UE by using the uplink data sending resource.

For a technical effect of the access network device provided in this embodiment of the present disclosure, refer to the technical effect of the access network device described in the paging method performed by the access network device in the second aspect. Details are not described herein again.

According to a fifth aspect, an embodiment of the present disclosure provides user equipment, including a processor, a memory, a communications interface, and a system bus.

The memory, the processor, and the communications interface are connected by using the system bus. The memory is configured to store a computer instruction, and the processor is configured to execute the computer instruction stored in the memory, so that the user equipment performs the paging method according to any one of the first aspect or optional manners of the first aspect.

Optionally, the memory is further configured to store an uplink data sending resource. The uplink data sending resource is an unscheduled uplink data sending resource or a shared uplink data sending resource.

According to a sixth aspect, an embodiment of the present disclosure provides an access network device, including a processor, a memory, a communications interface, and a system bus.

The memory, the processor, and the communications interface are connected by using the system bus. The memory is configured to store a computer instruction, and the processor is configured to execute the computer instruction stored in the memory, so that the access network device performs the paging method according to any one of the second aspect or optional manners of the second aspect.

Optionally, the memory is further configured to store an uplink data sending resource. The uplink data sending resource is an unscheduled uplink data sending resource or a shared uplink data sending resource.

According to a seventh aspect, an embodiment of the present disclosure provides a paging system, and the paging system includes an access network device and at least one user equipment. The at least one user equipment may be the user equipment in the third aspect or any optional manner of the third aspect, and the access network device may be the access network device in the fourth aspect or any optional manner of the fourth aspect.

According to an eighth aspect, an embodiment of the present disclosure provides a paging system, and the paging system includes an access network device and at least one user equipment. The at least one user equipment may be the user equipment in the third aspect or any optional manner of the third aspect, and the access network device may be the access network device in the fourth aspect or any optional manner of the fourth aspect.

The embodiments of the present disclosure provide the paging method, the device, and the system. The user equipment (UE) receives the paging information sent by the access network device, where the paging information is used to instruct the UE to send the paging response by using the uplink data sending resource; and the UE obtains the uplink data sending resource according to the paging information, and sends the paging response information to the access network device by using the uplink data sending resource. Based on the description in the foregoing embodiments, compared with a conventional process of establishing a radio link between an access network device and UE, in the paging method provided in the embodiments of the present disclosure, the UE does not need to initiate a random access process, so that there is little signaling exchange when the access network device pages the UE, a network resource is saved, and data transmission efficiency is improved.

BRIEF DESCRIPTION OF DRAWINGS

To describe the technical solutions in the embodiments of the present disclosure or in the prior art more clearly, the following briefly describes the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

The technology described in the embodiments of the present disclosure may be applied to various communications systems such as a 2G, 3G, or 4G communications system and a next generation communications system, for example, a global system for mobile communications (GSM) and another 2G system, a code division multiple access (CDMA) system, a time division multiple access (TDMA) system, a wideband code division multiple access (WCDMA) system, and another 3G system, a long term evolution (LTE) system and another 4G system, and a mobile communications system of a subsequent LTE evolution standard, or another similar communications system.

Figure 1:
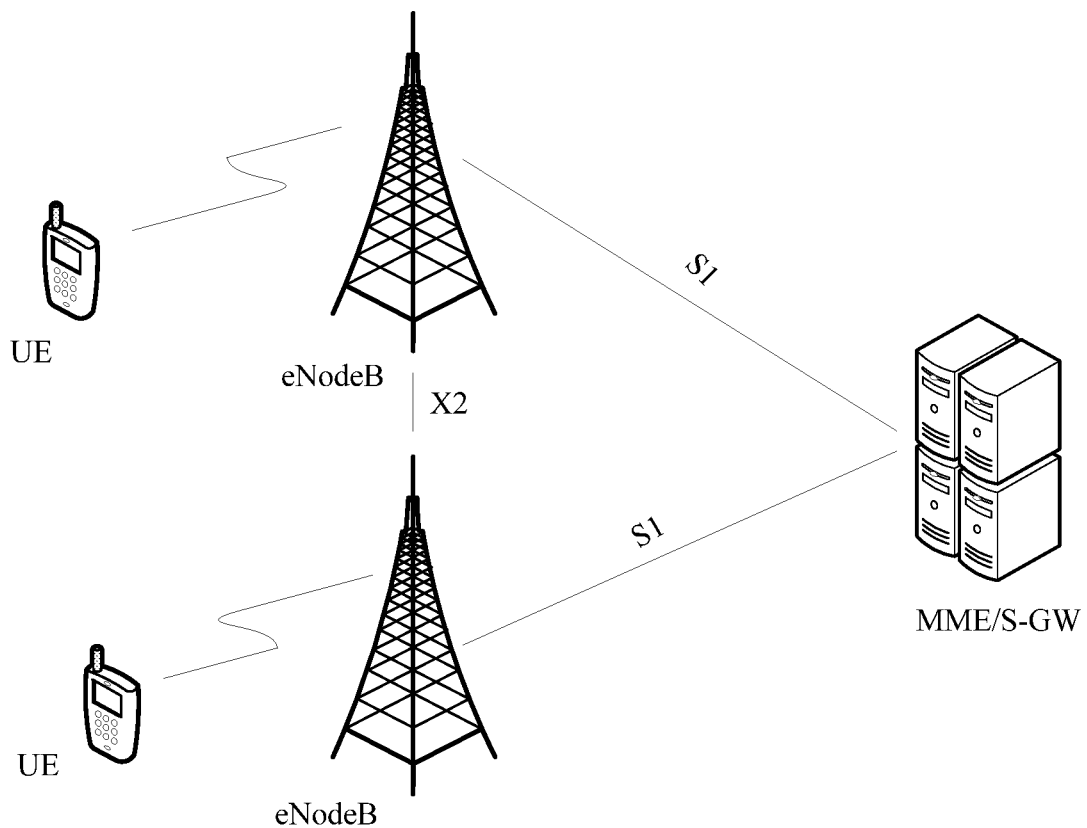
FIG. 1 is an architecture diagram of an LTE system according to an embodiment of the present disclosure.

The LTE system is used as an example. FIG. 1 is an architecture diagram of an LTE system according to an embodiment of the present disclosure. The LTE system has only a packet domain. Two network elements are included, that is, an evolved packet core (EPC) and an evolved NodeB (eNode B). The EPC is responsible for a core network part, including a mobility management entity (MME) and a serving gateway (S-GW). The MME performs signaling processing, and the S-GW performs data processing. The eNodeB is responsible for an access network part that is also referred to as an evolved universal terrestrial radio access network (E-UTRAN). A paging method provided in the embodiments of the present disclosure is performed between the eNodeB and a terminal.

Figure 2:
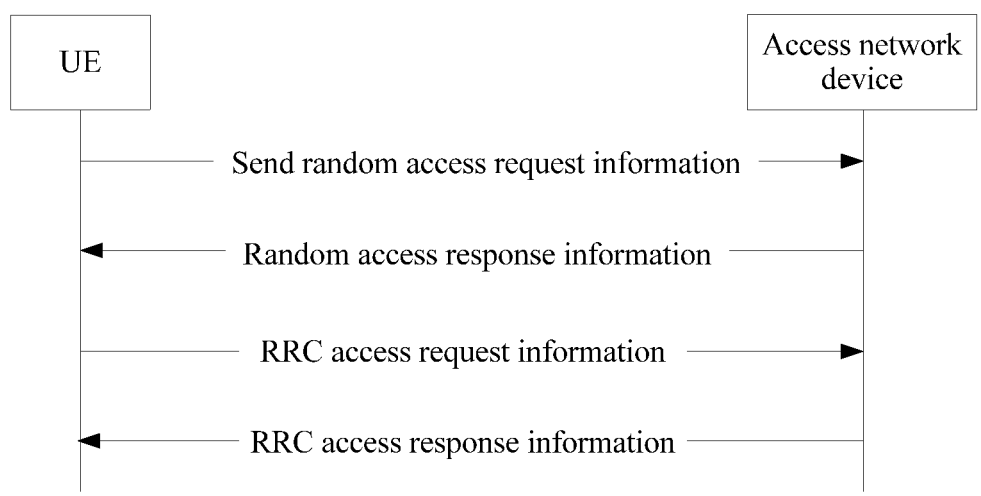
FIG. 2 is a schematic flowchart of a process of randomly accessing an access network device by UE in the prior art.

After receiving paging information sent by an access network device, existing UE establishes a radio link to the access network device in a random access manner. For example, the UE establishes the radio link to the access network device in a contention random access manner, and a random access process is shown in FIG. 2. Step 1: The UE first sends random access request information to the access network device, where the random access request information includes a first random preamble sequence. Step 2: The UE receives random access response information sent by the access network device, where the random access response information includes an identifier used to indicate a second random preamble sequence. Step 3: If the first random preamble sequence is the same as the second random preamble sequence, the UE sends radio resource control (RRC) access request information to the access network device. Step 4: The UE receives RRC access response information sent by the access network device. In this case, the radio link between the UE and the access network device is established. The UE sends paging response information to the access network device by using a scheduled uplink data sending resource, and then data transmission may be performed between the UE and the access network device. A process of establishing the radio link between the access network device and the UE is complex, and there are a plurality of times of signaling exchange. Consequently, a relatively large quantity of network resources are occupied, and data transmission efficiency is low.

The paging method provided in this embodiment of the present disclosure may be usually applied to a transmission scenario of sparse small data packets. In this scenario, the access network device may send only one small data packet to the UE in a quite long period of time. Therefore, a relatively large quantity of network resources are occupied in the conventional paging method. However, in the present disclosure, in a manner in which UE sends paging response information to an access network device by using an uplink data sending resource, the UE does not need to initiate a random access process, so that there is little signaling exchange when the access network device pages the UE, a network resource is saved, and data transmission efficiency is improved.

It should be noted that in a communications service, both spectrum resources and power resources are limited, but a user quantity and a service amount are different. A system cannot consider only a part of users, and resources need to be properly allocated, so that the users in the system can perform normal and sound communication. Such an allocation method or strategy is a scheduling algorithm or a scheduling technology. An unscheduled uplink data sending resource mentioned in the embodiments of the present disclosure is an uplink data sending resource that does not need to be allocated by the system according to a scheduling request of the UE. A shared uplink data sending resource mentioned in the embodiments of the present disclosure is an uplink data sending resource that can be used by a plurality of UEs. The shared uplink data sending resource may be an unscheduled uplink data sending resource or one or more pre-scheduled shared resources.

In addition, the access network device mentioned in the embodiments of the present disclosure may be a hardware device such as a base station, a router, or a concentrator that is usually used for remote access to a network resource, and this is not specifically limited in the embodiments of the present disclosure.

It should be noted that the terms "system" and "network" may be used interchangeably in this specification. The term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

Figure 3:
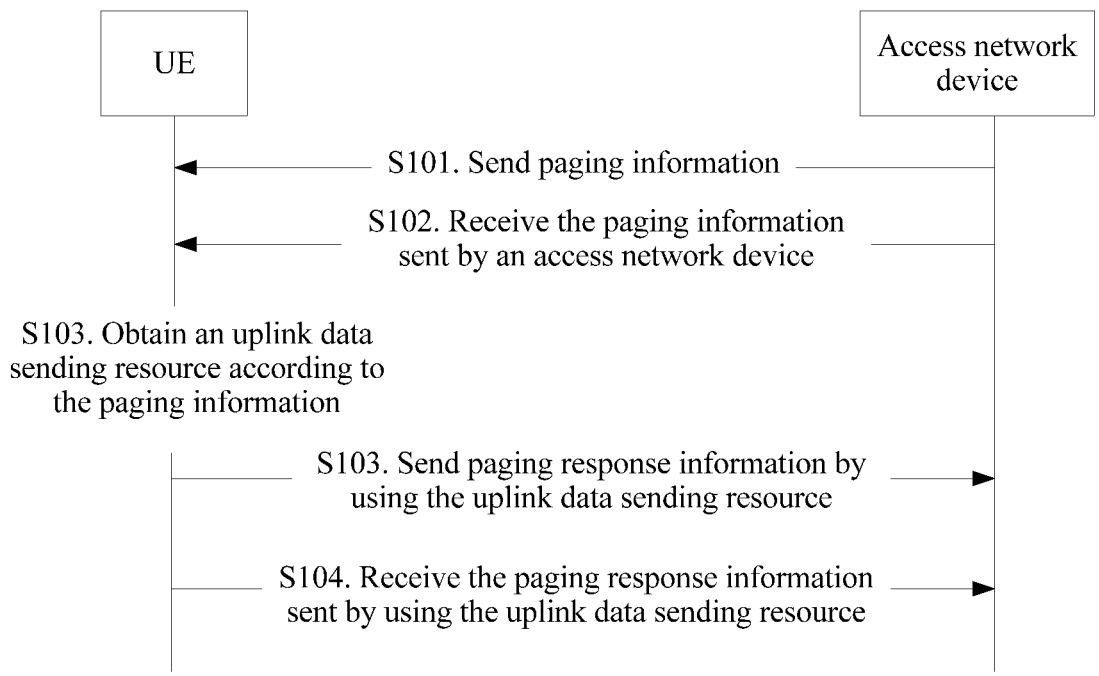
FIG. 3 is a schematic flowchart 1 of a paging method according to an embodiment of the present disclosure.

An embodiment of the present disclosure provides a paging method. As shown in FIG. 3, the paging method includes the following steps.

S101. An access network device sends paging information to UE.

For example, the paging information is used to instruct the UE to send a paging response by using an uplink data sending resource. The uplink data sending resource is an unscheduled uplink data sending resource or a shared uplink data sending resource.

Optionally, the paging information may include first information, and the first information includes a cell radio network temporary identifier (RNTI) and a higher layer identifier of the UE. The higher layer identifier of the UE is any one or more of a system architecture evolution-temporary mobile subscriber identity (S-TMSI), mobility management entity-temporary mobile subscriber identity (M-TMSI), an international mobile subscriber identity (IMSI), or an internet protocol (IP) address of the UE. In addition, it should be noted that the higher layer identifier of the UE is not limited to the identifiers provided above, and may include another higher layer identifier that can identify an identity of the UE. This is not limited in the present disclosure.

Further, the RNTI is allocated by the access network device to the UE, and the RNTI and the higher layer identifier of the UE are in a mapping relationship.

Optionally, the paging information may include dedicated access preamble sequence information, and the dedicated access preamble sequence information includes dedicated access preamble sequence code.

S102. The UE receives the paging information sent by the access network device.

This step is corresponding to step S101. In step S101, the access network device sends the paging information to the UE, and accordingly, the UE receives the paging information sent by the access network device.

It should be supplemented that, the paging information may be further used to instruct the UE to transit a state. For example, the paging information is used to instruct one or more UEs to transit from a power saving state to a non-power saving state.

S103. The UE obtains the uplink data sending resource according to the paging information, and sends paging response information to the access network device by using the uplink data sending resource.

For example, the unscheduled uplink data sending resource or the shared uplink data sending resource may be sent before the access network device pages the UE, and may be sent by the access network device to the UE by means of broadcasting or by using dedicated signaling or configuration information. The UE receives and stores the uplink data sending resource. After receiving the paging information sent by the access network device, the UE can select a stored uplink data sending resource according to an instruction of the paging information, and send the paging response information to the access network device by using the uplink data sending resource. In a broad sense, the uplink data sending resource is a resource shared by a group of UEs, and may be pre-scheduled and allocated by the access network device to the UE by using a scheduling channel.

Optionally, the UE may select a proper uplink data sending resource according to a modulation and coding scheme, a transport block size, uplink load information, an uplink conflict probability, air interface quality, or the like. Alternatively, the UE may select a resource according to a value of an allocated ID of the UE or an original ID of the UE. Alternatively, the UE may be fixedly mapped to an uplink resource according to received downlink resource information. This is not listed herein one by one.

It should be noted that the manner in which the UE selects the stored uplink data sending resource may be that the UE randomly selects an uplink data sending resource or the UE selects an uplink data sending resource according to the higher layer identifier of the UE. However, this is not limited thereto.

S104. The access network device receives the paging response information sent by the UE by using the uplink data sending resource.

This step is corresponding to step S103. In step S103, the UE obtains the uplink data sending resource according to the paging information, and sends the paging response information to the access network device by using the uplink data sending resource, and accordingly, the access network device receives the paging response information sent by the UE by using the uplink data sending resource.

The paging response information may be a radio resource control (RRC) message or a media access control layer (MAC) packet. If the paging response information is a MAC packet, the higher layer identifier of the UE is in the MAC packet.

Further, the paging response information optionally carries a channel quality indicator (CQI), channel state information (CSI), or a data buffer status report. The CQI is an information indicator of channel quality, represents quality of a current channel, and is corresponding to a value of a signal-to-noise ratio of a channel. The CSI is a channel attribute of a communications link, and the CSI describes a fading factor of a signal in each transmission path, that is, a value of each element in a channel gain matrix H, such as signal scattering, environment fading, distance attenuation, or other information. The CSI may enable a communications system to adapt to a current channel status, and ensure high-reliability and high-speed communication in a multiple-antenna system. For example, whether the UE adds the foregoing information to the paging response information may be based on network indication, for example, indicated in a paging message, or notified to the UE by using a dedicated message or a broadcast message.

It should be further supplemented that, if the paging information instructs the UE to transit a state, the UE initiates proper uplink signaling according to a state to which the UE is to be transited, to instruct a network to confirm the state migration. Further, the network may subsequently configure configuration information required by a target state to which the UE is to be transited, including a UE identifier required by the target state to which the UE is to be transited and related radio configuration information.

Further, after receiving the paging response information sent by the UE, the access network device notifies the UE of a special RNTI and PDCCH demodulation information on a physical downlink control channel (PDCCH), and sends a downlink data packet on the PDCCH. In this case, the access network device may scramble an entire PDCCH information part and a CRC part by using the higher layer identifier of the UE or the RNTI; or the access network device first generates CRC by using control information on the PDCCH, and then scrambles a PDCCH information part by using the higher layer identifier of the UE, and scrambles a CRC part by using the RNTI, so as to ensure downlink data packet sending security.

Likewise, after receiving the downlink data packet sent by the access network device, the UE uses a descrambling manner corresponding to the foregoing scrambling manner, that is, the UE first descrambles the entire PDCCH information part and the CRC part by using the higher layer identifier of the UE or the RNTI; or the UE first descrambles the PDCCH information part by using the higher layer identifier of the UE, and then descrambles the CRC part by using the RNTI, and performs check, so as to process the downlink data packet.

Figure 4:
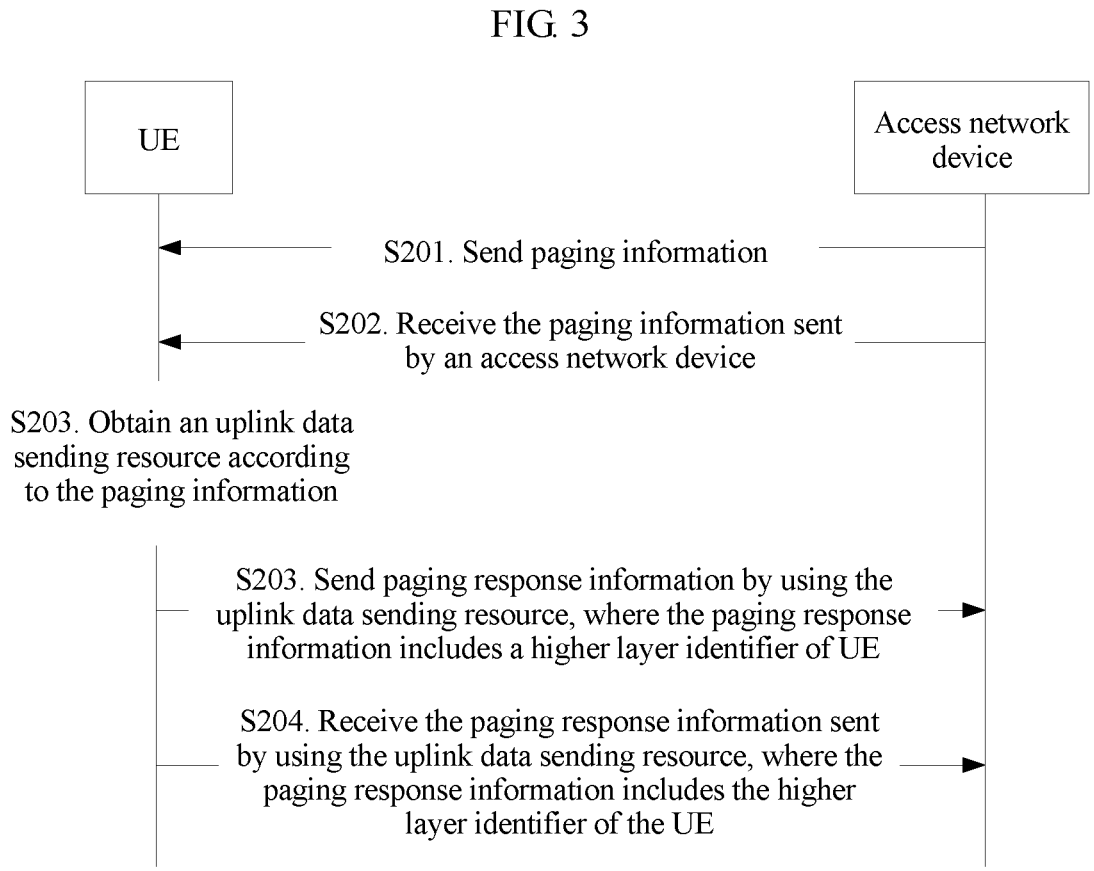
FIG. 4 is a schematic flowchart 2 of a paging method according to an embodiment of the present disclosure.

For example, the paging information includes neither the first information nor the dedicated access preamble sequence information. An embodiment of the present disclosure provides a paging method. As shown in FIG. 4, the paging method includes the following steps.

S201. An access network device sends paging information to UE.

S202. The UE receives the paging information sent by the access network device.

S203. The UE obtains an uplink data sending resource according to the paging information, and sends paging response information to the access network device by using the uplink data sending resource, where the paging response information includes a higher layer identifier of the UE.

If the paging information includes neither first information nor dedicated access preamble sequence information, the paging response information includes the higher layer identifier of the UE. The higher layer identifier of the UE is any one or more of an S-TMSI, an M-TMSI, an IMSI, or an IP address of the UE.

S204. The access network device receives the paging response information sent by the UE by using the uplink data sending resource, where the paging response information includes the higher layer identifier of the UE.

Figure 5:
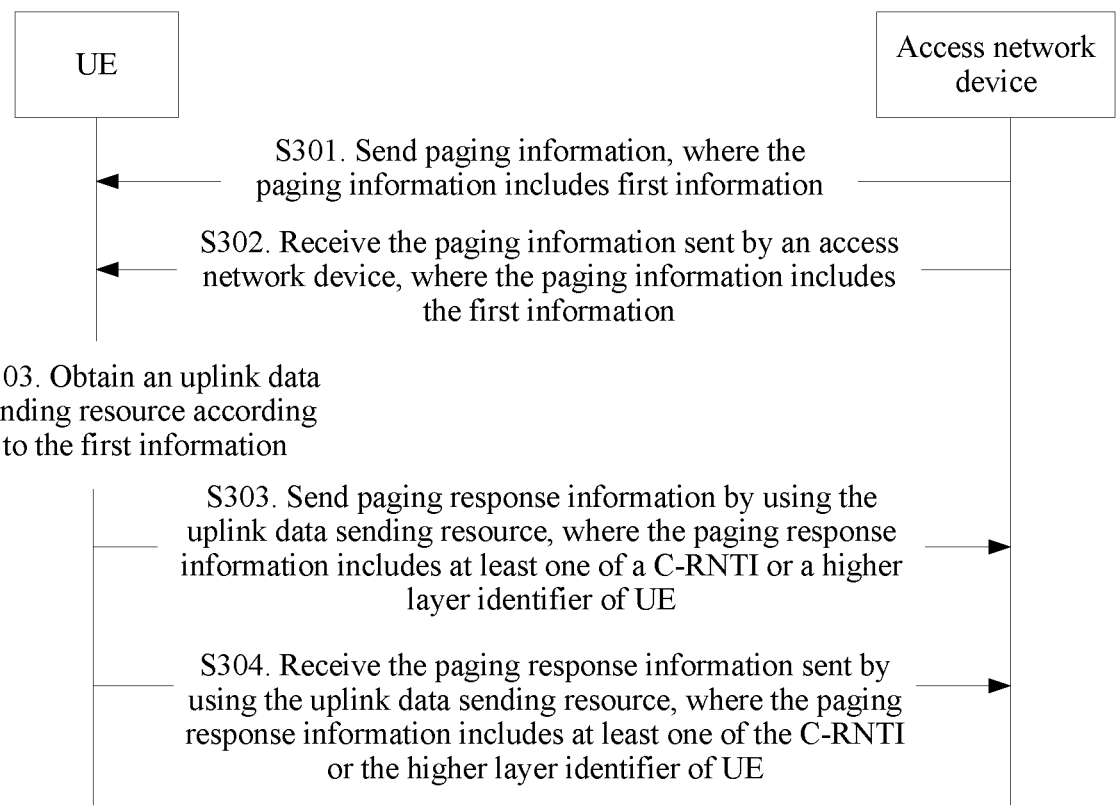
FIG. 5 is a schematic flowchart 3 of a paging method according to an embodiment of the present disclosure.

For example, the paging information includes first information. An embodiment of the present disclosure provides a paging method. As shown in FIG. 5, the paging method includes the following steps.

S301. An access network device sends paging information to UE, where the paging information includes first information.

It should be noted that when the access network device determines to page UE that is in an idle state, a non-synchronous state, or a loose synchronous state, if the UE does not have an RNTI, the access network device allocates an RNTI to the UE, and if there is more than one UE, the access network device allocates an RNTI to each UE, or allocates an RNTI group to a plurality of UEs. In addition, the RNTI in the present disclosure, that is, the RNTI and the RNTI group mentioned in this embodiment of the present disclosure, may be a unique air interface identifier in a range of one or more cells, and is valid when the UE is in the idle state or the non-synchronous state. Optionally, a length of the RNTI in the present disclosure may be greater than a length of an existing cell-level RNTI.

Further optionally, the UE can start a timer after receiving the RNTI. The timer is configured to indicate whether the RNTI is valid, that is, before the timer times out, the RNTI is valid, and if the timer times out, it indicates that the RNTI is invalid.

Optionally, if the UE already has an RNTI before receiving the RNTI, the UE may replace the original RNTI or instruct the access network device to use the original RNTI.

It should be supplemented that, the RNTI mentioned in this embodiment of the present disclosure may be but is not limited to a cell-radio network temporary identity (C-RNTI) or an evolved universal terrestrial radio access network-radio network temporary identity (u-RNTI).

S302. The UE receives the paging information sent by the access network device, where the paging information includes the first information.

S303. The UE obtains an uplink data sending resource according to the first information, and sends paging response information to the access network device by using the uplink data sending resource, where the paging response information includes at least one of an RNTI and a higher layer identifier of the UE.

If the paging information includes the first information, the paging response information includes at least one of the RNTI and the higher layer identifier of the UE.

S304. The access network device receives the paging response information sent by the UE by using the uplink data sending resource, where the paging response information includes at least one of the RNTI and the higher layer identifier of the UE.

Optionally, the RNTI may be further used as a first part of control information on a physical shared uplink channel (PUSCH), and one or several fixed modulation manners may be used for the information. After receiving the paging response information, the access network device first decodes the RNTI, and then obtains content of a subsequent data part, to facilitate a subsequent hybrid automatic repeat request (HARQ).

Optionally, the RNTI may be further used to scramble a cyclic redundancy check (CRC) of a PUSCH.

Optionally, if the UE receives again the paging information that carries the RNTI, the foregoing timer may be started again.

Figure 6:
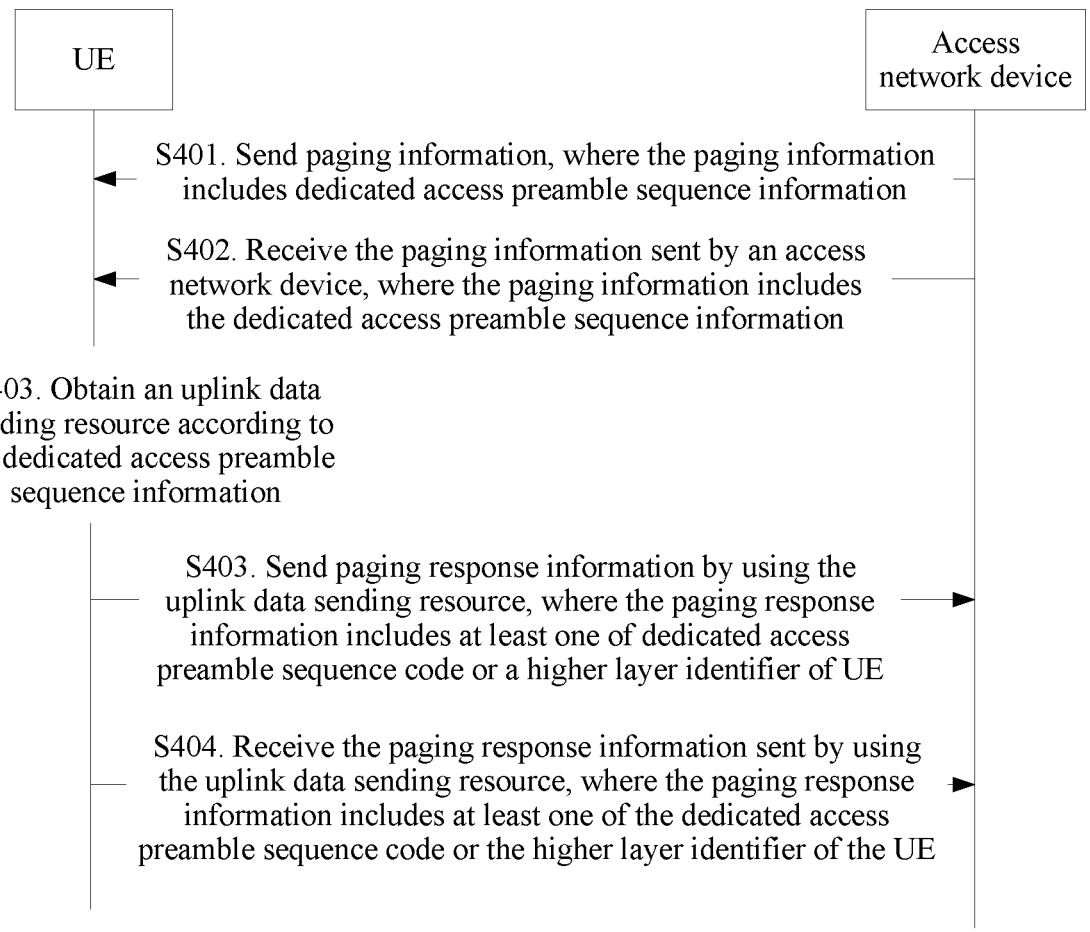
FIG. 6 is a schematic flowchart 4 of a paging method according to an embodiment of the present disclosure.

For example, the paging information includes dedicated access preamble sequence information. An embodiment of the present disclosure provides a paging method. As shown in FIG. 6, the paging method includes the following steps.

S401. An access network device sends paging information to UE, where the paging information includes dedicated access preamble sequence information.

Further optionally, the dedicated access preamble sequence information may include an available timeslot.

S402. The UE receives the paging information sent by the access network device, where the paging information includes the dedicated access preamble sequence information.

S403. The UE obtains an uplink data sending resource according to the dedicated access preamble sequence information, and sends paging response information to the access network device by using the uplink data sending resource, where the paging response information includes at least one of dedicated access preamble sequence code and a higher layer identifier of the UE.

If the paging information includes the dedicated access preamble sequence information, the paging response information includes at least one of the dedicated access preamble sequence code and the higher layer identifier of the UE. The higher layer identifier of the UE is any one or more of an S-TMSI, an M-TMSI, an IMSI, or an IP address of the UE.

S404. The access network device receives the paging response information sent by the UE by using the uplink data sending resource, where the paging response information includes at least one of the dedicated access preamble sequence code and the higher layer identifier of the UE.

For example, after receiving the dedicated access preamble sequence code, the access network device does not need to send access response information to the UE, and directly sends data to the UE.

It should be further supplemented that, in this embodiment of the present disclosure, if the paging information sent by the access network device instructs to page only one UE, the UE may determine an uplink feedback physical control channel resource according to a downlink PDCCH resource, and sends the paging response information by using a physical control channel; or the UE sends paging response information at a physical layer by using an unscheduled and shared uplink resource to which a resource on a downlink scheduling control channel is mapped.

This embodiment of the present disclosure provides the paging method. Based on the description in the foregoing embodiment, the paging information instructs the UE to send the paging response information by using the uplink data sending resource, and therefore, after receiving the paging information sent by the access network device, the UE can directly send the paging response information to the access network device by using the uplink data sending resource. Compared with a conventional process of establishing a radio link between an access network device and UE, in this embodiment of the present disclosure, the UE does not need to initiate a random access process, so that there is little signaling exchange when the access network device pages the UE, a network resource is saved, and data transmission efficiency is improved.

Figure 7:
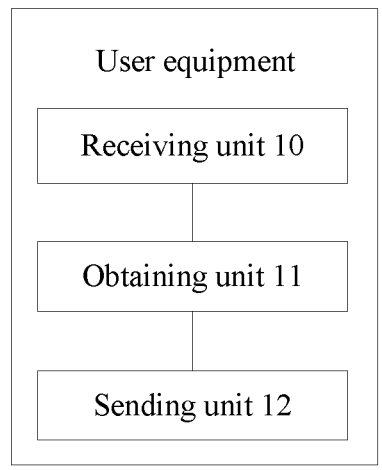
FIG. 7 is a schematic structural diagram of user equipment according to an embodiment of the present disclosure.

An embodiment of the present disclosure provides user equipment. As shown in FIG. 7, the user equipment is configured to perform the steps performed by the user equipment in the foregoing methods. The user equipment may include modules corresponding to the corresponding steps. For example, the user equipment may include a receiving unit 10, an obtaining unit 11, and a sending unit 12.

The receiving unit 10 is configured to receive paging information sent by an access network device, and the paging information is used to instruct the UE to send a paging response by using an uplink data sending resource.

The obtaining unit 11 is configured to obtain the uplink data sending resource according to the paging information after the receiving unit 10 receives the paging information sent by the access network device.

The sending unit 12 is configured to: after the obtaining unit 11 obtains the uplink data sending resource, send paging response information to the access network device by using the uplink data sending resource.

Optionally, the uplink data sending resource is an unscheduled uplink data sending resource or a shared uplink data sending resource.

Optionally, the paging response information includes a higher layer identifier of the UE, and the higher layer identifier of the UE is any one or more of a system architecture evolution-temporary mobile subscriber identity (S-TMSI), a mobility management entity-temporary mobile subscriber identity (M-TMSI), an international mobile subscriber identity (IMSI), or an internet protocol (IP) address of the UE.

Optionally, the paging information includes first information, the first information includes a radio network temporary identifier (RNTI) and a higher layer identifier of the UE, and the higher layer identifier of the UE is any one or more of an S-TMSI, an M-TMSI, an IMSI, or an IP address of the UE.

Optionally, the RNTI is allocated by the access network device to the UE, and the RNTI and the higher layer identifier of the UE are in a mapping relationship.

Optionally, the paging response information includes at least one of the RNTI and the higher layer identifier of the UE.

Optionally, the paging information includes dedicated access preamble sequence information, the dedicated access preamble sequence information includes dedicated access preamble sequence code and a higher layer identifier of the UE, and the higher layer identifier of the UE is any one or more of an S-TMSI, an M-TMSI, an IMSI, or an IP address of the UE.

Optionally, the paging response information includes at least one of the dedicated access preamble sequence code and the higher layer identifier of the UE.

It may be understood that the user equipment in this embodiment may be user equipment served by a cell of the foregoing base station or another base station, the user equipment may be corresponding to the user equipment in the paging method in the embodiment in any one of FIG. 3, FIG. 4, FIG. 5, or FIG. 6, divisions and/or functions of the modules of the user equipment in this embodiment are to implement the method process shown in any one of FIG. 3, FIG. 4, FIG. 5, or FIG. 6, and for brevity, details are not described herein.

Optionally, in another embodiment of the present disclosure, a function of the receiving unit 10 may be implemented by a receiver, a function of the obtaining unit 11 may be implemented by a processor, and a function of the sending unit 12 may be implemented by a transmitter. The receiver and the transmitter may be integrated in a transceiver.

This embodiment of the present disclosure provides the user equipment. Based on the description in the foregoing embodiment, the paging information instructs the UE to send the paging response information by using the uplink data sending resource, and therefore, after a receiving unit receives the paging information sent by the access network device, a sending unit can directly send the paging response information to the access network device by using the uplink data sending resource. Compared with a conventional process of establishing a radio link between an access network device and UE, in this embodiment of the present disclosure, the UE does not need to initiate a random access process, so that there is little signaling exchange when the access network device pages the UE, a network resource is saved, and data transmission efficiency is improved.

Figure 8:
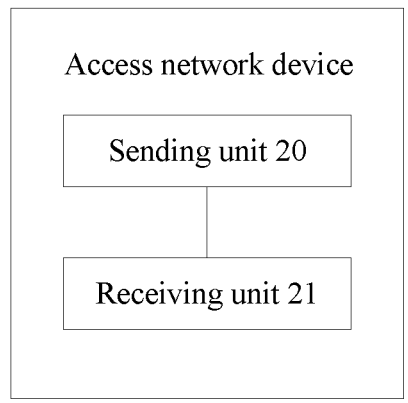
FIG. 8 is a schematic structural diagram of an access network device according to an embodiment of the present disclosure.

An embodiment of the present disclosure provides an access network device. As shown in FIG. 8, the access network device is configured to perform the steps performed by the access network device in the foregoing methods. The access network device may include modules corresponding to the corresponding steps. For example, the access network device includes a sending unit 20 and a receiving unit 21.

The sending unit 20 is configured to send paging information to user equipment (UE), and the paging information is used to instruct the UE to send a paging response by using an uplink data sending resource.

The receiving unit 21 is configured to: after the sending unit 20 sends the paging information to the UE, receive paging response information sent by the UE by using the uplink data sending resource.

Optionally, the uplink data sending resource is an unscheduled uplink data sending resource or a shared uplink data sending resource.

Optionally, the paging response information includes a higher layer identifier of the UE, and the higher layer identifier of the UE is any one or more of a system architecture evolution-temporary mobile subscriber identity (S-TMSI), a mobility management entity-temporary mobile subscriber identity (M-TMSI), an international mobile subscriber identity (IMSI), or an internet protocol (IP) address of the UE.

Optionally, the paging information includes first information, the first information includes a radio network temporary identifier (RNTI) and a higher layer identifier of the UE, and the higher layer identifier of the UE is any one or more of an S-TMSI, an M-TMSI, an IMSI, or an IP address of the UE.

Optionally, the RNTI is allocated by the access network device to the UE, and the RNTI and the higher layer identifier of the UE are in a mapping relationship.

Optionally, the paging response information includes at least one of the RNTI and the higher layer identifier of the UE.

Optionally, the paging information includes dedicated access preamble sequence information, the dedicated access preamble sequence information includes dedicated access preamble sequence code and a higher layer identifier of the UE, and the higher layer identifier of the UE is any one or more of an S-TMSI, an M-TMSI, an IMSI, or an IP address of the UE.

Optionally, the paging response information includes at least one of the dedicated access preamble sequence code and the higher layer identifier of the UE.

It may be understood that the access network device in this embodiment may be an access network device that is accessed by the foregoing user equipment, the access network device may be corresponding to the access network device in the paging method in the embodiment in any one of FIG. 3, FIG. 4, FIG. 5, or FIG. 6, divisions and/or functions of the modules of the access network device in this embodiment are to implement the method process shown in any one of FIG. 3, FIG. 4, FIG. 5, or FIG. 6, and for brevity, details are not described herein.

Optionally, in another embodiment of the present disclosure, a function of the sending unit 20 may be implemented by a transmitter, and a function of the receiving unit 21 may be implemented by a receiver. The receiver and the transmitter may be integrated in a transceiver.

This embodiment of the present disclosure provides the access network device. Based on the description in the foregoing embodiment, the paging information instructs the UE to send the paging response information by using the uplink data sending resource, and therefore, after sending the paging information, the access network device can directly receive the paging response information sent by the UE by using the uplink data sending resource. Compared with a conventional process of establishing a radio link between an access network device and UE, in this embodiment of the present disclosure, the UE does not need to initiate a random access process, so that there is little signaling exchange when the access network device pages the UE, a network resource is saved, and data transmission efficiency is improved.

Figure 9:
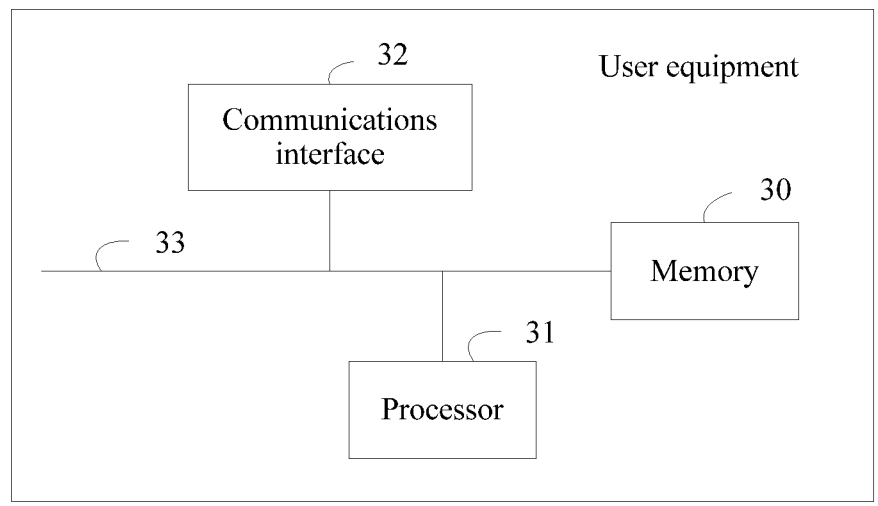
FIG. 9 is a schematic hardware diagram of user equipment according to an embodiment of the present disclosure.

An embodiment of the present disclosure further provides user equipment. As shown in FIG. 9, the user equipment includes a memory 30, a processor 31, a communications interface 32, and a system bus 33.

The memory 30, the processor 31, and the communications interface 32 are connected by using the system bus 33. The memory 30 is configured to store some computer instructions, and the processor 31 is configured to execute the computer instructions, so that the user equipment performs the paging method shown in any one of FIG. 3, FIG. 4, FIG. 5, or FIG. 6. For a specific paging method, refer to the related description in the embodiment shown in any one of FIG. 3, FIG. 4, FIG. 5, or FIG. 6. Details are not described herein again.

Further, the memory is configured to store an uplink data sending resource. The uplink data sending resource is an unscheduled uplink data sending resource or a shared uplink data sending resource.

The processor 31 may be a central processing unit (CPU). The processor 31 may further be another general purpose processor, a digital signal processor (DSP), an application-specific integrated circuit (ASIC), a field programmable gate array (FPGA) or another programmable logic device, a discrete gate or transistor logic device, or a discrete hardware assembly. The general purpose processor may be a microprocessor, or the processor may be any conventional processor or the like.

The processor 31 may be a dedicated processor, and the dedicated processor may include at least one of a baseband processing chip, and a radio frequency processing chip, or the like. Further, the dedicated processor may include a chip that has another dedicated processing function of the user equipment.

The memory 30 may include a volatile memory, for example, a random access memory (RAM); the memory 30 may also include a non-volatile memory, for example, a read-only memory (ROM), a flash memory, a hard disk drive (HDD), or a solid-state drive (SSD); and the memory 30 may further include a combination of the foregoing types of memories.

The system bus 33 may include a data bus, a power bus, a control bus, a signal status bus, and the like. In this embodiment, for clear description, various buses are represented by the system bus 33 in FIG. 9.

The communications interface 32 may include a receiver and a transmitter. In addition, in specific implementation of the user equipment, the receiver and the transmitter may be a transceiver of the user equipment. The transceiver may be a radio transceiver. For example, the radio transceiver may be an antenna of the user equipment. The processor 31 performs data receiving and transmitting with another device such as an access network device by using the transceiver.

In a specific implementation process, the steps in the method process shown in any one of FIG. 3, FIG. 4, FIG. 5, or FIG. 6 may be implemented by using a computer execution instruction in a hardware execution hardware form. To avoid repetition, details are not described herein.

This embodiment of the present disclosure provides the user equipment. Based on the description in the foregoing embodiment, the paging information instructs the UE to send the paging response information by using the uplink data sending resource, and therefore, after the receiver receives the paging information sent by the access network device, the transmitter of the user equipment can directly send the paging response information to the access network device by using the uplink data sending resource. Compared with a conventional process of establishing a radio link between an access network device and UE, in this embodiment of the present disclosure, the UE does not need to initiate a random access process, so that there is little signaling exchange when the access network device pages the UE, a network resource is saved, and data transmission efficiency is improved.

Figure 10:
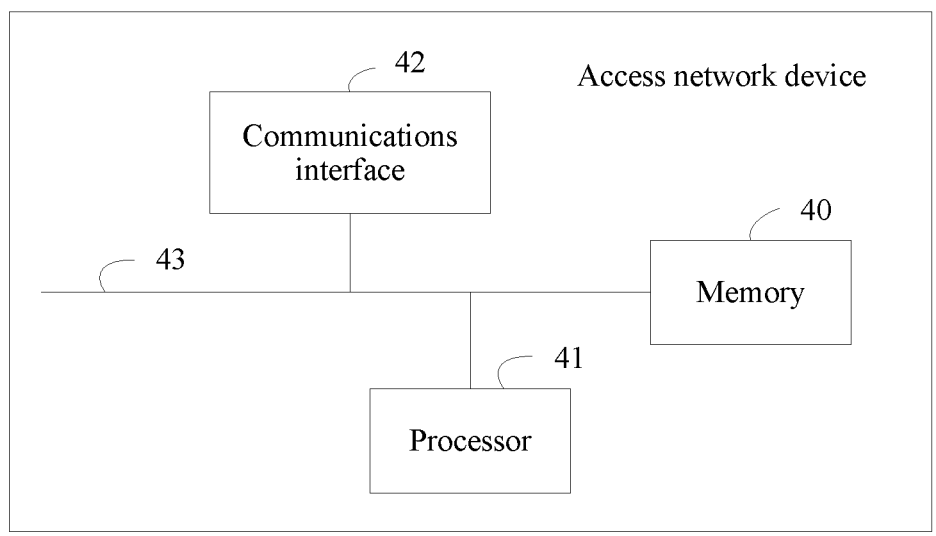
FIG. 10 is a schematic hardware diagram of an access network device according to an embodiment of the present disclosure.

An embodiment of the present disclosure further provides an access network device. As shown in FIG. 10, the access network device includes a memory 40, a processor 41, a communications interface 42, and a system bus 43.

The memory 40, the processor 41, and the communications interface 42 are connected by using the system bus 43. The memory 40 is configured to store some computer instructions, and the processor 41 is configured to execute the computer instructions, so that the access network device performs the paging method shown in any one of FIG. 3, FIG. 4, FIG. 5, or FIG. 6. For a specific paging method, refer to the related description in the embodiment shown in any one of FIG. 3, FIG. 4, FIG. 5, or FIG. 6. Details are not described herein again.

Further, the memory is configured to store an uplink data sending resource. The uplink data sending resource is an unscheduled uplink data sending resource or a shared uplink data sending resource.

The processor 41 may be a CPU. The processor 41 may further be another general purpose processor, a DSP, an ASIC, an FPGA or another programmable logic device, a discrete gate or a transistor logic device, or a discrete hardware assembly. The general purpose processor may be a microprocessor, or the processor may be any conventional processor or the like.

The processor 41 may be a dedicated processor, and the dedicated processor may include at least one of a baseband processing chip, and a radio frequency processing chip, or the like. Further, the dedicated processor may include a chip that has another dedicated processing function of the user equipment.

The memory 40 may include a volatile memory, for example, a RAM. The memory 40 may also include a non-volatile memory, for example, a ROM, a flash memory, an HDD, or an SSD. The memory 40 may further include a combination of the foregoing types of memories.

The system bus 43 may include a data bus, a power bus, a control bus, a signal status bus, and the like. In this embodiment, for clear description, various buses are represented by the system bus 43 in FIG. 10.

The communications interface 42 may include a receiver and a transmitter. In addition, in specific implementation of the access network device, the receiver and the transmitter may be a transceiver of the access network device. The transceiver may be a radio transceiver. For example, the radio transceiver may be an antenna of the access network device. The processor 41 performs data receiving and transmitting with another device such as UE by using the transceiver.

In a specific implementation process, the steps in the method process shown in any one of FIG. 3, FIG. 4, FIG. 5, or FIG. 6 may be implemented by using a computer execution instruction in a hardware execution hardware form. To avoid repetition, details are not described herein.

This embodiment of the present disclosure provides the access network device. Based on the description in the foregoing embodiment, the paging information instructs the UE to send the paging response information by using the uplink data sending resource, and therefore, after sending the paging information, the access network device can directly receive the paging response information sent by the UE by using the uplink data sending resource. Compared with a conventional process of establishing a radio link between an access network device and UE, in this embodiment of the present disclosure, the UE does not need to initiate a random access process, so that there is little signaling exchange when the access network device pages the UE, a network resource is saved, and data transmission efficiency is improved.

An embodiment of the present disclosure provides a paging system, and the system includes an access network device and at least one user equipment. For description of the user equipment, for example, refer to the related description of the user equipment in the foregoing embodiments shown in FIG. 7 and FIG. 9. For description of the access network device, for example, refer to the related description of the access network device in the foregoing embodiments shown in FIG. 8 and FIG. 10. Details are not described herein again.

In the paging system provided in this embodiment of the present disclosure, the at least one user equipment separately performs corresponding steps in the method process shown in any one of FIG. 3, FIG. 4, FIG. 5, or FIG. 6, to implement the paging method in the embodiments of the present disclosure, and accordingly, the access network device performs corresponding steps in the method process shown in any one of FIG. 3, FIG. 4, FIG. 5, or FIG. 6, to implement the paging method in the embodiments of the present disclosure.

It may be clearly understood by a person skilled in the art that, for the purpose of convenient and brief description, division of the foregoing function modules is used as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments. Details are not described herein again.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computerreadable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A paging method, comprising:
receiving, by user equipment (UE), an unscheduled uplink data sending resource or a shared uplink data sending resource from an access network device by a broadcast information;
after receiving the unscheduled or a shared uplink data sending resource, receiving, by the UE, paging information from the access network device, wherein the paging information is used to instruct the UE to send a paging response information to the access network device by using the unscheduled or shared uplink data sending resource;
selecting, by the UE, an uplink data sending resource from the unscheduled or shared uplink data sending resource; and
sending, by the UE, paging response information to the access network device by using the selected uplink data sending resource.

2. The paging method according to claim 1, wherein the paging response information comprises a higher layer identifier of the UE, and the higher layer identifier of the UE is any one or more of a system architecture evolution-temporary mobile subscriber identity (S-TMSI), a mobility management entity-temporary mobile subscriber identity (M-TMSI), an international mobile subscriber identity (IMSI), or an internet protocol (IP) address of the UE.

3. The paging method according to claim 1, wherein the paging information comprises first information, the first information comprises a radio network temporary identifier (RNTI) and a higher layer identifier of the UE, and the higher layer identifier of the UE is any one or more of an S-TMSI, an M-TMSI, an IMSI, or an IP address of the UE.

4. The paging method according to claim 1, wherein selecting an uplink data sending resource from the unscheduled or shared uplink data sending resource, comprising:
selecting an uplink data sending resource according to a modulation and coding scheme, a transport block size, uplink load information, an uplink conflict probability, or air interface quality from the unscheduled or shared uplink data sending resource; or
selecting randomly an uplink data sending resource from the unscheduled or shared uplink data sending resource.

5. A user equipment (UE), comprising:
a receiver, configured to:
receive an unscheduled uplink data sending resource or a shared uplink data sending resource from an access network device by a broadcast information, and
after receiving the unscheduled or shared uplink data sending resource, receive paging information from the access network device, wherein the paging information is used to instruct the UE to send a paging response information to the access network device by using the unscheduled or shared uplink data sending resource;
a processor, configured to:
select an uplink data sending resource from the unscheduled or shared uplink data sending resource; and
a transmitter, configured to, send paging response information to the access network device by using the selected uplink data sending resource.

6. The user equipment according to claim 5, wherein the paging response information comprises a higher layer identifier of the UE, and the higher layer identifier of the UE is any one or more of a system architecture evolution-temporary mobile subscriber identity (S-TMSI), a mobility management entity-temporary mobile subscriber identity (M-TMSI), an international mobile subscriber identity (IMSI), or an internet protocol (IP) address of the UE.

7. The user equipment according to claim 5, wherein the paging information comprises first information, the first information comprises a radio network temporary identifier (RNTI) and a higher layer identifier of the UE, and the higher layer identifier of the UE is any one or more of an S-TMSI, an M-TMSI, an IMSI, or an IP address of the UE.

8. The user equipment according to claim 7, wherein the RNTI is allocated by the access network device to the UE, and the RNTI and the higher layer identifier of the UE are in a mapping relationship.

9. The user equipment according to claim 7, wherein the paging response information comprises at least one of the RNTI and the higher layer identifier of the UE.

10. The user equipment according to claim 5, wherein the paging information comprises dedicated access preamble sequence information, the dedicated access preamble sequence information comprises dedicated access preamble sequence code and a higher layer identifier of the UE, and the higher layer identifier of the UE is any one or more of an S-TMSI, an M-TMSI, an IMSI, or an IP address of the UE.

11. The user equipment according to claim 10, wherein the paging response information comprises at least one of the dedicated access preamble sequence code and the higher layer identifier of the UE.

12. The user equipment according to claim 5, wherein selecting an uplink data sending resource from the unscheduled or shared uplink data sending resource, comprising:
selecting an uplink data sending resource according to a modulation and coding scheme, a transport block size, uplink load information, an uplink conflict probability, or air interface quality from the unscheduled or shared uplink data sending resource; or
selecting randomly an uplink data sending resource from the unscheduled or shared uplink data sending resource.

13. An access network device, comprising:
a transmitter, configured to:
send an unscheduled uplink data sending resource or a shared uplink data sending resource to user equipment (UE) by a broadcast information, and after sending the unscheduled or shared uplink data sending resource, send paging information to the UE, wherein the paging information is used to instruct the UE to send a paging response information to the access network device by using the unscheduled or shared uplink data sending resource; and a receiver, configured to receive paging response information from the UE by using the unscheduled or shared uplink data sending resource.

14. The access network device according to claim 13, wherein the paging response information comprises a higher layer identifier of the UE, and the higher layer identifier of the UE is any one or more of a system architecture evolution-temporary mobile subscriber identity (S-TMSI), a mobility management entity-temporary mobile subscriber identity (M-TMSI), an international mobile subscriber identity (IMSI), or an internet protocol (IP) address of the UE.

15. The access network device according to claim 13, wherein the paging information comprises first information, the first information comprises a radio network temporary identifier (RNTI) and a higher layer identifier of the UE, and the higher layer identifier of the UE is any one or more of an S-TMSI, an M-TMSI, an IMSI, or an IP address of the UE.

16. The access network device according to claim 15, wherein the RNTI is allocated by the access network device to the UE, and the RNTI and the higher layer identifier of the UE are in a mapping relationship.

17. The access network device according to claim 15, wherein the paging response information comprises at least one of the RNTI and the higher layer identifier of the UE.

18. The access network device according to claim 13, wherein the paging information comprises dedicated access preamble sequence information, the dedicated access preamble sequence information comprises dedicated access preamble sequence code and a higher layer identifier of the UE, and the higher layer identifier of the UE is any one or more of an S-TMSI, an M-TMSI, an IMSI, or an IP address of the UE.

19. The access network device according to claim 18, wherein the paging response information comprises at least one of the dedicated access preamble sequence code and the higher layer identifier of the UE.

* * * * *